Nov. 15, 1932. J. E. KETONEN 1,887,932
TANK
Filed June 18, 1928 2 Sheets-Sheet 1
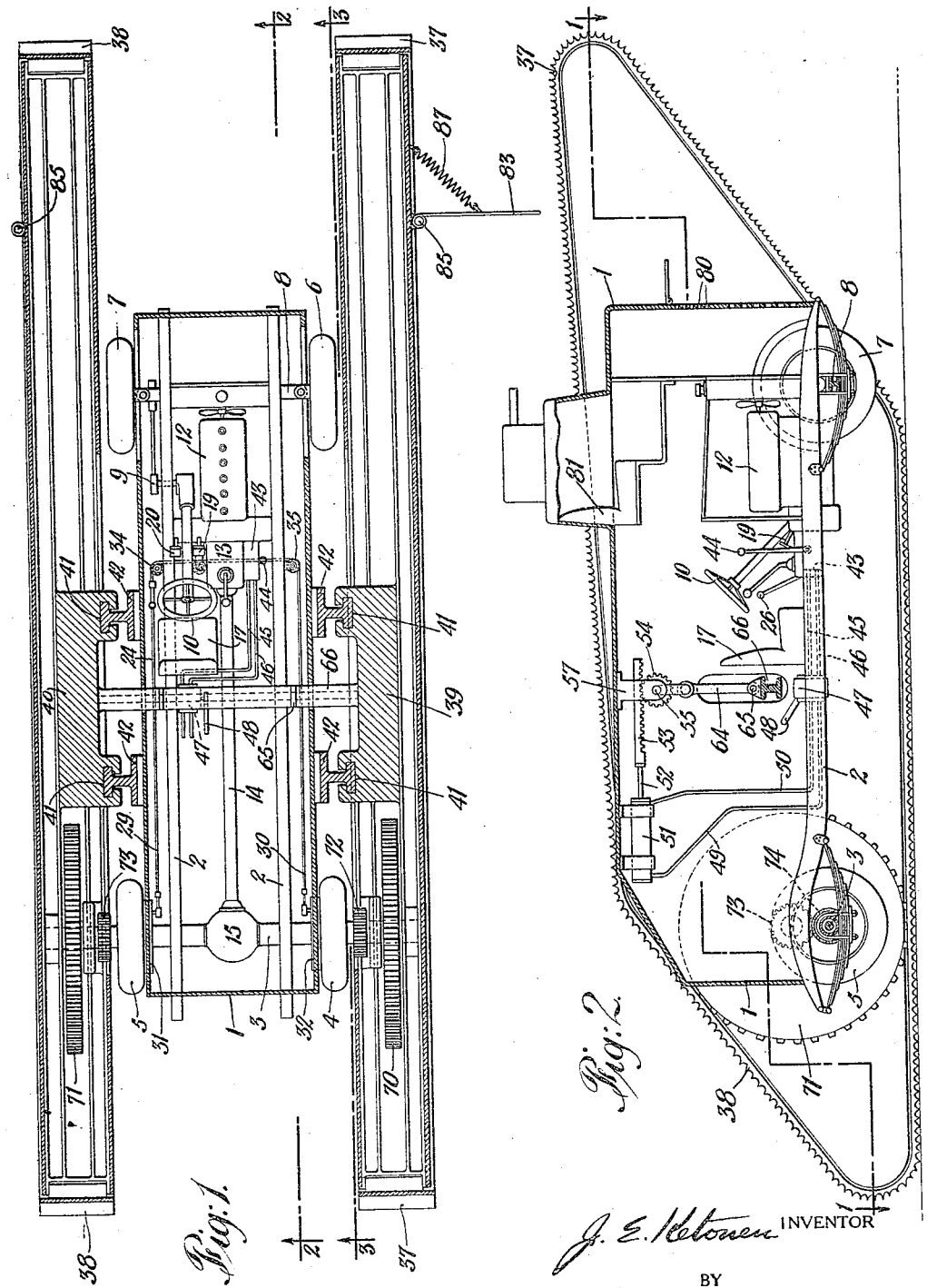

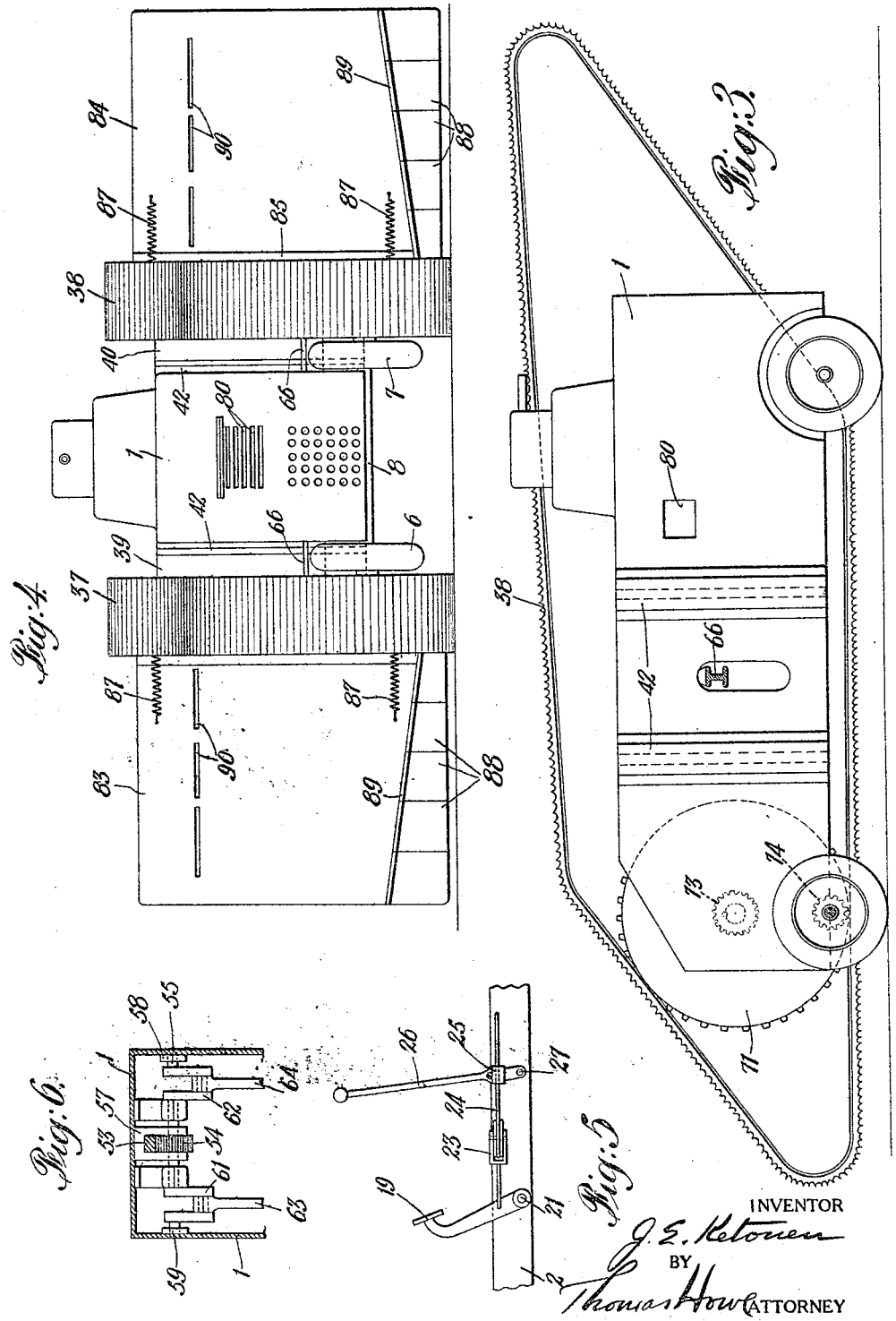

Patented Nov. 15, 1932

1,887,932

UNITED STATES PATENT OFFICE

JOHN E. KETONEN, OF WHITE PLAINS, NEW YORK

TANK

Application filed June 18, 1928. Serial No. 286,162.

This invention relates to tanks or like automobile devices in which an endless flexible tread is used to contact with the surface of the ground and having a self-contained source of power. It more particularly relates to vehicles which are used for warfare and other military purposes.

It is an object of this invention to provide a vehicle tank with additional means of locomotion aside from the flexible endless tread, on which it may be moved with more speed and celerity from place to place whenever surfaces or roads are encountered of the proper nature. It is well known that automobile arrangements which are dependent upon flexible endless treads for their locomotion are limited in their speed on account of the large number of moving parts and the friction and vibration therebetween.

Another object of this invention is to coordinate a flexible endless tank arrangement with auxiliary wheels such that the whole arrangement may be readily transported over good road surfaces with considerable speed and at the same time a driving connection may be readily made with the flexible endless treads so that they may be utilized whenever the surfaces over which the tank must traverse become rougher.

Another object of the invention is to improve the operating mechanism of an automobile tank so as to more readily adapt it for use according to the purposes desired.

A still further object is to provide an automobile tank with sideshields so that infantry skirmish lines may advance behind these shields without unduly being exposed to the fire of the enemy.

Further and more definite objects will appear from the following specification, claims and drawings, in which:

Fig. 1 shows a top plan view of my improved tank in section on the lines 1—1 of Fig. 2;

Fig. 2 shows a sectional view of my tank arrangement along the lines 2—2 of Fig. 1;

Fig. 3 shows another sectional view from the side along the lines 3—3 of Fig. 1;

Fig. 4 shows an assembly view from the front of the tank, as a whole, with the side protecting shields extended;

Fig. 5 shows a detail of the braking and steering mechanism; and

Fig. 6 shows a detail of the mechanism used to raise and lower the endless flexible tread from the surface over which the tank is traveling.

Referring now more particularly to the drawings, the main body 1 is supported upon the ordinary channel frame 2, as shown in Figs. 1 and 2, similar to the ordinary construction in an automobile. The drive axle 3 is also of the customary automobile construction with wheels 4 and 5. The front wheels 6 and 7 are mounted upon the axle 8 in such a way that they may be steered by the steering mechanism 9 from the wheel 10. The engine 12 is connected through the transmission 13 to the drive shaft 14 and to the differential 15 on the rear axle. This mechanism is arranged according to standard automobile construction. The driver's seat is located at 17 so as to be convenient to the steering wheel and other control mechanism to be described.

There is provided the customary brake and clutch connection pedals 19 and 20 respectively. The brake pedal 19, more clearly shown in Fig. 5, is connected to the shaft 21 which is rotatably mounted on the main frame 2. To this brake pedal is connected a sheave 23 over which runs the cable 24. A clamp 25 is secured to this cable and also to a lever 26. This lever 26 is also pivoted at 27 to the main frame 2. It is apparent from this construction that by depressing the pedal 19 the two ends of the cable 24 may be tensed equally on account of the sheave 23, but with the movement of the lever 26 manually in either direction, one end or the other end of the cable 24 may be tensed.

Referring again to Fig. 1 it is apparent that if the end 29 of the cable 24 is tensed, this end being connected to the brake 31 of the wheel 5, this brake will be applied but the brake 32 on the wheel 4 to which is connected the end 30 of the cable 24, will not be applied. The brake 32 may also be applied without applying the brake 31 if the lever 26 is pushed in the opposite direction. This braking arrangement is for the purpose of steering the apparatus when it is resting upon its endless flexible treads. The cable 24 also rides over the pulleys 34 and 35 in order that a more direct pull may be obtained on the brakes 31 and 32.

Thus, it is apparent that the brake pedal may be used when the arrangement is resting upon the automobile wheels 4 and 5 and for ordinary braking purposes, while the lever 26 may be used to steer the tank when it is resting upon the endless flexible treads. Also, the brake pedal 19 may be used for braking purposes when resting on the treads.

In order to raise and lower the endless flexible tread upon the main body 1 these treads 37 and 38 are each mounted upon main frames 39 and 40 in which are arranged the T slots 41. The rail beams 42 are secured to the side portions of the main body 1 by means of bolts, rivets, or otherwise and are arranged to fit snugly in the slots 41 so as to permit sliding movement between the treads 37 and 38 in the main body 1. A power-driven hydraulic pump 43 with a lever 44 for throwing it into gear with the engine 12 is also provided having connection pipes 45 and 46. These pipes 45 and 46 lead to two-way valve 47 controlled by the handle 48 so as to connect the pipes 45 and 46 to the pipes 49 and 50 or vice versa. These pipes 49 and 50 lead to the piston and cylinder arrangement 51 having an extended piston rod 52 connected to the rack 53. This rack meshes with a gear 54 conected on the crank shaft 55 and securely keyed thereto. The arrangement of this crank shaft is more clearly shown in Fig. 6. The rack 53 passes through the bracket 57 which maintains it securely in driving relation to the gear 54. The ends of the crank shaft are mounted in the bearings 58 and 59 in the main frame 1 of the tank. The cranks 61 and 62 carry the connecting rods 63, 64 which cooperate with the connection 65 on an I-beam 66. This I-beam 66 is fastened at each end to the main frames 39 and 40 as shown in Fig. 1 so that these frames may be moved jointly, causing the raising and lowering of the treads 37 and 38.

It is apparent from this arrangement of parts, that having turned the handle 44 so as to cause the pump to be thrown into gear any suitable fluid may be forced into the cylinder 51 causing the piston rod 52 to be reciprocated in either direction depending upon the position of the handle 48 of the two way valve 47, thereby causing the crank shaft 55 to rotate and raising or lowering the treads 37 and 38 in either desired direction and maintaining them in this position on account of the toggle effect of the crank arms 61 and 62. The movement of the lever 48 to a neutral position after having again disconnected the pump 3 will maintain the piston rod 52 securely in this position since no fluid can flow in or out of the pump cylinder 51.

The endless flexible treads 37 and 38, once having been forced downwardly so as to contact with the ground and raise the automobile wheels therefrom, have a driver comprising the drive wheels 70 and 71. To these drive wheels are connected the gears 72 and 73 respectively. These drive wheels are mounted on the frames 39 and 40 so as to permit rotation of them. When the treads are forced downwardly as shown in Fig. 2, the gears 72 mesh with the gears 74 mounted on the end of the shaft on which the automobile wheels 4 and 5 are mounted. Thus, it will be seen that the gears 72 and 74, and the gears 73 and 74 cause a driving connection between the automobile wheels and the drivers 71 and 72. It will be observed that the paths of the continuous treads 37 and 38 do not, at any time throughout their adjustments, change their relationship to the axis of rotation of their drivers 70 and 71 so that the path in which the continuous tread moves bears a constant relation to the axis of rotation of its driver. It is apparent that in order to cause a forward movement of the tank it will be necessary to throw the automobile transmission into reverse and for this reason it is desirable to have a larger number of graded reverse gears than is ordinarily customary in the regular automobile arrangement. It is possible to arrange for four or five slow speed reverse gear arrangements and three or four high speed forward automobile gears as is customary in standard practice. In this way the forward movement of the tank on its automobile wheels may be at high speed while the forward movement of the arrangement on the endless flexible treads may be at a considerably lower speed giving the requisite pulling power needed when traveling over rough country.

Necessary peep holes 80 permitting the driver to see in various directions could be used. Also the gunner positioned in the seat 81 may aid in directing the movement of the tank.

In order to protect infantrymen which are advancing in the same line with the tanks, certain end shields 83 and 84 may be provided which are hinged along a vertical line at 85 to the side body of the endless flexible tread. Springs 87 may be used to maintain the shields 83 and 84 in a position perpendicular to the line of movement. Near the bottom of the shields 83 there may be provided a series of plates 88 hinged along the line 89 to the shields 83 and 84 so as to offer slight resistance to uneven projections along the surface of the ground. Slots 90 may be provided in the shields for sighting purposes. These shields also prevent the tank from becoming upset and aid in maintaining it in upright position.

All of the parts not specifically mentioned are of standard construction according to the well known state of the art attained in automobile and endless flexible tread tractor structure. It is not desired to be limited to the exact modifications and constructions shown but slight deviations therefrom can well be made and different embodiments of the general construction could be utilized without departing from the spirit and scope of the invention. It is desired to be limited only to the extent indicated in the following claims.

What I claim is:

1. In a vehicle the combination of a plurality of continuous treads, frames supporting the treads, a main tank body having an automobile suspension, sliding connections between the main tank body and the frames supporting the treads, a motor carried by said main tank body, driving gear connected with said motor and with said main tank body for enabling said motor to drive said automobile suspension, hoisting mechanism connected with said motor and driven thereby for raising and lowering the frames and treads carried thereby relatively to said automobile suspension, and gearing connected with said hoisting mechanism and actuated by hoisting movements thereof for connecting said driving gear with said treads and for disconnecting the same therefrom.

2. In a vehicle the combination of a plurality of continuous treads, frames supporting the treads, a main tank body having an automobile suspension, sliding connections between the main tank body and the frames supporting the treads, a motor carried by said main tank body, driving gear connected with said motor and with said main tank body for enabling said motor to drive said mechanism for raising and lowering the frames and treads carried thereby relatively to said automobile suspension, drive wheels connected with said frames which support the treads, gearing for enabling said drive wheels to be actuated from said automobile suspension, and means controllable by movements of said hoisting mechanism for disconnecting said last mentioned gearing.

3. A vehicle consisting of a main tank body, an automobile chassis having wheels, continuous treads, frames supporting the treads, a mechanism for raising and lowering said treads relative to said chassis, a motor adapted to drive said wheels, said mechanism and said treads in their lowered position, said treads and said frames enclosing said chassis and said wheels on two sides parallel to the longitudinal axis of said chassis, means hingedly attached to said frames for preventing said vehicle from overturning and said means being adapted to furnish protection for infantry against gunfire.

4. A vehicle consisting of an automobile chassis with wheels having fixed axles in relation to the longitudinal axis of said chassis, the combination with continuous treads, of a driver therefor, the said treads moving in a path bearing a constant relation to the axis of rotation of said driver, said treads being outside of said chassis and said wheels, means for raising and lowering said treads relative to said chassis, a motor adapted to drive said wheels, said mechanism, and said treads, common braking means for said chassis wheels and said treads, and said braking means being adapted to steer said vehicle by said treads when in their lowered position 5. A vehicle consisting of a main tank body, an automobile chassis having wheels with fixed axles in relation to the longitudinal axis of said chassis, the combination with continuous treads, of a driver therefor, said treads moving in a path bearing a constant relation to the axis of rotation of said driver, said treads being outside of said chassis and said wheels and being mounted on frames slidably related to said main body and said chassis, said frames and said treads enclosing said chassis on two sides in vertical planes parallel to the longitudinal axis of the said chassis, driving wheels for said treads and for said chassis, a mechanism for raising and lowering said treads, a motor adapted to drive said wheels, said mechanism and said treads, a common differential for said wheels and said treads, gearing means operatively related to said wheels, driving wheels actuated by said mechanism for engaging with the driving wheels of said treads when in their lowered position, common braking means for both of said driving wheels, said braking means being adapted to steer said vehicle and said treads when in their lowered position.

In testimony whereof I have signed this specification this 9th day of June 1928.

JOHN E. KETONEN.